Mar. 13, 1923.
C. WILSON
OIL SAVER
Filed Sept. 10, 1921
1,448,243
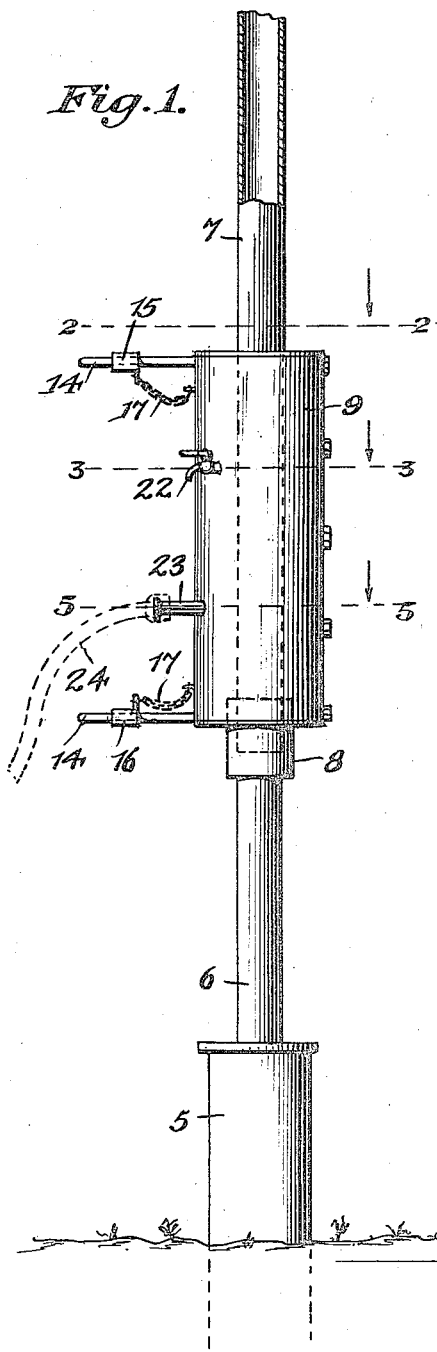
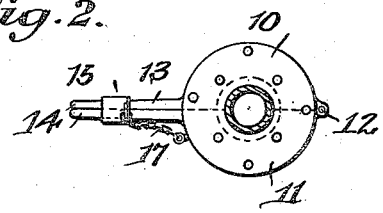
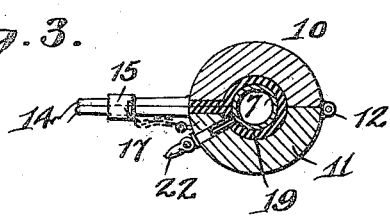
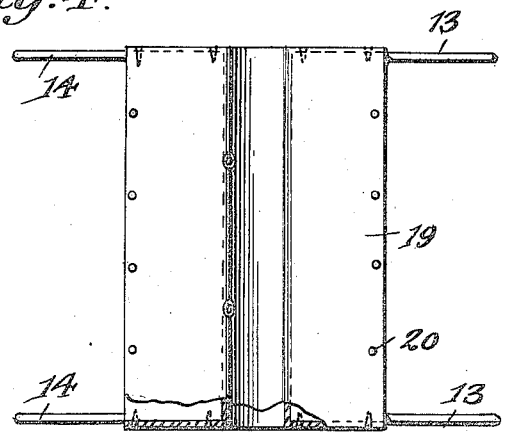
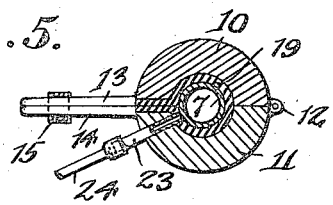
Claude Wilson, INVENTOR.
BY
ATTORNEY.

Patented Mar. 13, 1923.

1,448,243

UNITED STATES PATENT OFFICE.

CLAUDE WILSON, OF OIL HILL, KANSAS.

OIL SAVER.

Application filed September 10, 1921. Serial No. 499,804.

*To all whom it may concern:*

Be it known that I, CLAUDE WILSON, citizen of the United States, residing at Oil Hill, in the county of Butler and State of Kansas, have invented certain new and useful Improvements in Oil Savers, of which the following is a specification.

This invention relates to an oil saving device and more particularly to a novel and improved attachment adapted to be secured to a pipe coupling and feed pipe, whereby the oil contained therein may be saved when the sections of the pipe are disconnected.

In the oil well districts, a considerable quantity of oil is wasted due to the fact that when the oil pipe leading from the well is disconnected, the oil contained in the sections of the pipe is permitted to flow on the ground and is thus lost. The primary object, therefore, of the invention is to salvage what has heretofore been a waste by providing an attachment whereby the oil may be drained from the said sections of the pipe and utilized. The invention therefore contemplates the construction of a novel and improved device capable of attachment and detachment wherever desired with the incident saving of a considerable quantity of oil which would otherwise be lost.

One of the objects of the invention, therefore, is the provision of a hingedly connected, sectional container adapted to securely embrace an oil pipe and a pipe coupling, including a rubber lining therefor forming a non-leakable casing or container, whereby the oil may be drained therefrom when one of the pipes is disconnected.

Another and very important object of the invention is the provision of an attachment adapted to be installed on oil feed lines, particularly those leading from casings in oil wells, and one in which the parts are extremely simple in construction, easily assembled, rigid and durable, highly efficient in operation, practical and capable of being manufactured at a very low cost whereby its commercial possibilities are greatly enhanced.

The invention will be best understood from a consideration of the following detailed description taken in connection with the accompanying drawing forming a part of this specification, with the understanding, however, that the invention is not confined to any strict conformity with the showing in the drawing, but may be changed and modified so long as such changes and modifications mark no material departure from the salient features of the invention as expressed in the appended claim.

I attain these objects and others in the accompanying drawings, wherein:

Figure 1 is a view showing the invention as applied to two sections of the pipe and a coupling;

Figure 2 is a view taken on the line 2—2 of Figure 1;

Figure 3 is a view taken on the line 3—3 of Figure 1;

Figure 4 is a detail view showing the casing when open; and,

Figure 5 is a sectional view taken on the line 5—5 of Figure 1.

Referring now to the drawings wherein like reference characters designate corresponding parts throughout the several views, 5 designates the casing in an oil well and 7 the lower pipe section connected to the top section 6 of a feed pipe through a coupling 8 in a manner well understood. A casing designated in its entirety by numeral 9 consists of two semi-cylindrical sections 10, 11 hingedly connected as at 12 and adapted to tightly embrace one section of the pipe 7 and the coupling 8 in the manner shown by Figure 1 of the drawing. Each section of the casing 10, 11, is provided with handles 13, 14, at its top and bottom ends and ferrules 15, 16 securely held by chains 17 to prevent the same from being lost which are adapted to be slipped over the ends of the said handles and securely retain the same in locked position. Within the interior portion of the casing, I have provided a resilient lining 19 preferably of thick rubber, securely held and fastened to the casing by screws 20 or other fastening elements, the said lining being only open at its front when the sections of the casing are separated and having the tendency of keeping the sections of the casing together, forming a tight seal at the open side thereof. The said casing is provided with a pet cock 22 whereby air may be introduced and assists in forcing the oil out more freely through the drain pipe 23 to which a hose shown in dotted lines and designated by numeral 24 may be connected whereby the oil from the casing may be drained and consequently saved.

It will thus be seen that by attaching the novel and improved device above described to the respective sections and the pipe coupling that when the top section 7 is partly removed and detached from the coupling that the oil contained in the section 7 may flow into the casing and out through the pipe 23 and thus the oil which would be otherwise lost would be salvaged.

In the accompanying drawings, I have illustrated my invention embodied in one form by way of example, and which in practice has been found to be highly satisfactory in obtaining the desired results. It will be obvious however that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having thus described my invention what I claim as new and desire to secure by Letters Patent of the United States is:

A pipe or feed line attachment comprising a sectional casing adapted for detachable connection to a feed pipe and pipe coupling, a resilient inner lining secured to said casing and tending to maintain the sections together, complementary handles for each of said sections, loosely carried ferrules for clamping said complementary handles together to form a non-leakable fluid container, a drain pipe and pet cock in one of said sections whereby fluid may be drained from the container when the feed pipe is disconnected from the pipe coupling.

In testimony whereof I affix my signature in presence of two witnesses.

CLAUDE WILSON.

Witnesses:
LAURA HALL,
WM. K. JOHNSON.